US012747138B2

(12) United States Patent
Gong et al.

(10) Patent No.: US 12,747,138 B2
(45) Date of Patent: Sep. 29, 2026

(54) BRAKE SYSTEM FOR A CONVEYOR SYSTEM, METHOD FOR DETECTING A BRAKE OF A CONVEYOR SYSTEM, AND CONTROLLER

(71) Applicant: Otis Elevator Company, Farmington, CT (US)

(72) Inventors: Xinwei Gong, Haining (CN); Lifei Cheng, Hangzhou (CN); Kaisheng Xu, Haining (CN); Zhaoxia Hu, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 63 days.

(21) Appl. No.: 18/771,424

(22) Filed: Jul. 12, 2024

(65) Prior Publication Data

US 2025/0033934 A1 Jan. 30, 2025

(30) Foreign Application Priority Data

Jul. 25, 2023 (CN) ......................... 202310920885.6

(51) Int. Cl.
*B66B 23/00* (2006.01)
*B66B 25/00* (2006.01)
(Continued)

(52) U.S. Cl.
CPC ............ *B66B 27/00* (2013.01); *B66B 25/006* (2013.01); *F16D 49/16* (2013.01); *F16D 66/00* (2013.01);
(Continued)

(58) Field of Classification Search
None
See application file for complete search history.

(56) References Cited

U.S. PATENT DOCUMENTS 3,830,344 A * 8/1974 Cervenec ................ F16D 49/16 188/75
5,337,878 A * 8/1994 Mehlert .................. B66B 29/00 188/75

(Continued)

FOREIGN PATENT DOCUMENTS

CN 106438784 A * 2/2017 ........... F16D 66/021
CN 107814288 A * 3/2018 ........... F16D 66/028

(Continued)

OTHER PUBLICATIONS

European Search Report for Application No. 24190532.2, Issued Dec. 17, 2024, 8 Pages.

*Primary Examiner* — Gene O Crawford
*Assistant Examiner* — Muhammad Awais
(74) *Attorney, Agent, or Firm* — CANTOR COLBURN LLP

(57) ABSTRACT

A brake system for a conveyor system. The brake system includes a brake, a distance detection device and a controller. The brake includes a brake arm and a brake lining connected to the brake arm. The distance detection device is arranged on the brake for detecting a first distance and a second distance between the brake arm and a brake drum, where the first distance is a distance between the brake arm and the brake drum when the brake is in an open state, and the second distance is a distance between the brake arm and the brake drum when the brake is in a closed state. The controller is used for determining a brake performance of the brake based on a difference between the first distance and the second distance detected sequentially, and for generating and sending warning signals when the difference is not within a preset range.

15 Claims, 6 Drawing Sheets

(51) Int. Cl.

| | |
|---|---|
| ***B66B 27/00*** | (2006.01) |
| ***F16D 49/16*** | (2006.01) |
| ***F16D 66/00*** | (2006.01) |
| *G08B 21/02* | (2006.01) |

(52) U.S. Cl.
CPC ........ *F16D 2066/003* (2013.01); *G08B 21/02* (2013.01)

(56) References Cited

U.S. PATENT DOCUMENTS

| | | | | | |
|---|---|---|---|---|---|
| 5,419,415 | A * | 5/1995 | Lamb | F16D 66/024 | 200/61.4 |
| 5,559,286 | A * | 9/1996 | White | F16D 66/026 | 73/129 |
| 5,939,978 | A * | 8/1999 | Kyrtsos | F16D 66/024 | 188/1.11 R |
| 6,095,289 | A * | 8/2000 | Ray | F16D 66/00 | 188/1.11 R |
| 6,267,219 | B1 * | 7/2001 | Spannhake | B66B 27/00 | 198/322 |
| 10,214,382 | B2 * | 2/2019 | Wei | B66B 1/36 | |
| 2011/0011682 | A1 * | 1/2011 | Erny | F16D 49/16 | 187/393 |
| 2015/0129365 | A1 * | 5/2015 | Olkkonen | B66D 5/08 | 187/250 |
| 2016/0152440 | A1 * | 6/2016 | Hopp | B66B 5/02 | 198/323 |
| 2017/0313550 | A1 * | 11/2017 | Vakkamäki | B66B 1/36 | |
| 2022/0081253 | A1 * | 3/2022 | Lindegger | B66B 1/32 | |

FOREIGN PATENT DOCUMENTS

| | | | | |
|---|---|---|---|---|
| CN | 110065875 | A * | 7/2019 | B66B 5/00 |
| EP | 0502282 | A1 * | 9/1992 | B66D 5/30 |
| EP | 3138801 | A1 * | 3/2017 | B66B 5/0018 |
| EP | 3725723 | A1 * | 10/2020 | B66B 27/00 |
| JP | 2013174279 | A * | 9/2013 | |
| JP | 2014214797 | A * | 11/2014 | B66B 5/00 |
| JP | 2015107845 | A * | 6/2015 | B66B 5/005 |
| KR | 101623519 | B1 * | 5/2016 | F16D 65/12 |
| KR | 102070576 | B1 * | 1/2020 | F16D 66/02 |
| WO | WO-2012101091 | A1 * | 8/2012 | F16D 49/16 |

* cited by examiner

BRAKE SYSTEM FOR A CONVEYOR SYSTEM, METHOD FOR DETECTING A BRAKE OF A CONVEYOR SYSTEM, AND CONTROLLER

FOREIGN PRIORITY

This application claims priority to Chinese Patent Application No. 202310920885.6, filed Jul. 25, 2023, and all the benefits accruing therefrom under 35 U.S.C. § 119, the contents of which in its entirety are herein incorporated by reference.

TECHNICAL FIELD OF INVENTION

The present disclosure relates to a conveyor system, in particular to technologies related to the braking of conveyor systems.

BACKGROUND OF THE INVENTION

Escalators, travelators, and other conveyor systems have been widely used in various buildings, such as airports, shopping malls, etc., providing convenience for people's travel. To prevent problems such as excessive speed and reversal of escalators, escalators are generally equipped with brakes. The brake achieves braking of the escalator through the friction force generated when the brake lining and brake drum join with each other. With the use of the escalator, the brake will produce many times of brakes, which may cause wear or damage to the brake lining. Currently, the status of the brake lining is generally manually checked on a regular basis, with the brake lining replaced as needed, which makes it impossible to obtain the operating status of the escalator brake in real-time. For escalators with high safety requirements, there is room for improvement in the aspect of brake status detection.

SUMMARY OF THE INVENTION

The present disclosure provides a brake system for a conveyor system, so as to make improvements in at least one aspect as mentioned above.

A brake system for a conveyor system according to examples of the present disclosure may comprise: a brake comprising a brake arm and a brake lining connected to the brake arm; a distance detection device arranged on the brake for detecting a first distance and a second distance between the brake arm and a brake drum, where the first distance is a distance between the brake arm and the brake drum when the brake is in an open state, and the second distance is a distance between the brake arm and the brake drum when the brake is in a closed state; and a controller for determining a brake performance of the brake based on a difference between the first distance and the second distance detected sequentially, and for generating and sending warning signals when the difference is not within a preset range.

For the brake system, additionally or as an alternative, the distance detection device can be arranged on the brake in a way that is capable of sensing a distance between a set position of the brake arm and the brake drum, where the first distance and the second distance are distances between the set position and the brake drum in the open state and the closed state, respectively.

For the brake system, additionally or as an alternative, the distance detection device can be arranged within the braking arm, and the set position is a joint surface of the brake arm and the brake lining.

For the brake system, additionally or as an alternative, the distance detection device can be arranged within the brake arm near the set position.

For the brake system, additionally or as an alternative, the controller can be connected to an output unit and/or a remote monitoring room, that is, the controller can be connected to the output unit, or the controller can be connected to the remote monitoring room, or the controller can be connected to the output unit and to the remote monitoring room. Connection can be used, where the connection here includes any one or a combination of line connection and communication connection.

According to another aspect of the present disclosure, a detection method for a brake for a conveyor system is also provided. The method may comprise: detecting a first distance and a second distance between a brake arm and a brake drum of the brake, where the first distance is a distance between the brake arm and the brake drum when the brake is in an open state, and the second distance is a distance between the brake arm and the brake drum when the brake is in a closed state; comparing a difference between the first distance and the second distance with a preset range to determine a brake performance of the brake; and generating and sending warning signals when a comparison result shows that the difference is not within the preset range.

For the detection method for a brake for a conveyor system, additionally or as an alternative, detecting the first distance and the second distance between the brake arm and the brake drum of the brake may comprise: detecting, by a distance detection device arranged on the brake arm, a distance between a set position of the brake arm and the brake drum as the first distance when the brake is in an open state; and detecting, by the distance detection device, a distance between the set position of the brake arm and the brake drum as the second distance when the brake is in a closed state.

For the detection method for a brake for a conveyor system, additionally or as an alternative, the set position may be perpendicular to a joint surface of the brake lining and the brake drum when the brake lining joins with the brake drum.

For the detection method for a brake for a conveyor system, additionally or as an alternative, the distance detection device may be arranged at the set position, and the set position may be close to a surface of the brake arm used to connect the brake lining.

A controller is further provided, which may comprise a memory for storing instructions and a processor for executing the instructions, where when the instructions are being executed, the escalator brake system is made to: detects a first distance and a second distance between a brake arm and ta brake drum of a brake, where the first distance is a distance between the brake arm and the brake drum when the brake is in an open state, and the second distance is a distance between the brake arm and the brake drum when the brake is in a closed state; compare a difference between the first distance and the second distance with a preset range to determine a brake performance of the brake; and generate and send warning signals when a comparison result shows that the difference is not within the preset range.

A conveyor system is still further provided, which comprises any of the brake systems described above, or can execute any of the methods described above, or comprises the controller described above.

In the above examples, as an example, the distance detection device can be a distance sensor.

In the above examples, as an example, the conveyor system includes escalators, travelators, and other conveyor systems used to convey passengers and/or goods.

BRIEF DESCRIPTION OF THE DRAWINGS

The Embodiments of the Present Disclosure Will be Described in Detail Below in Conjunction with the Accompanying Drawings, so that the Present Disclosure can be Fully Understood, where.

DETAILED DESCRIPTION OF THE INVENTION

To assist those skilled in the art to gain a precise understanding of the subject matter claimed by the present disclosure, the specific embodiments of the present disclosure will be described in detail below in conjunction with the accompanying drawings.

The terms "first", "second", etc. in the description, claims, and accompanying drawings of the present disclosure are used to distinguish similar objects, rather than to describe a specific order or sequence thereof. It should be appreciated that the numbers used in this way can be interchanged with each other in appropriate cases, so that the embodiments of the invention described herein can be implemented in orders other than those illustrated or described herein. In addition, "first" and "second" are only used for descriptive purposes, and cannot be understood as indicating or implying relative importance or implying or indicating the quantity of technical features indicated. Therefore, the features defined with "first" and "second" can explicitly or implicitly include one or more of such features. In the depiction of the embodiments of the present disclosure, unless otherwise stated, "a plurality of" means two or more.

The terms "example", "as an example", or "illustratively", used in the following text mean "used as an example, embodiment, or illustration". Any embodiment depicted as an "example", or "as an example" or "illustratively" need not be interpreted as being superior or better than other embodiments.

The conveyor systems according to the present disclosure can be escalators, travelators, and other conveyor systems for conveying passengers and/or goods. Although the following embodiments of the present disclosure all use an escalator as a conveyor system to describe the present disclosure, it should be appreciated, however, that the various examples of a brake system for a conveyor system, a detection method for a brake for a conveyor system, a controller, etc. provided in the present disclosure are also applicable to other conveyor systems with brake functions, such as travelators.

Figure 1:
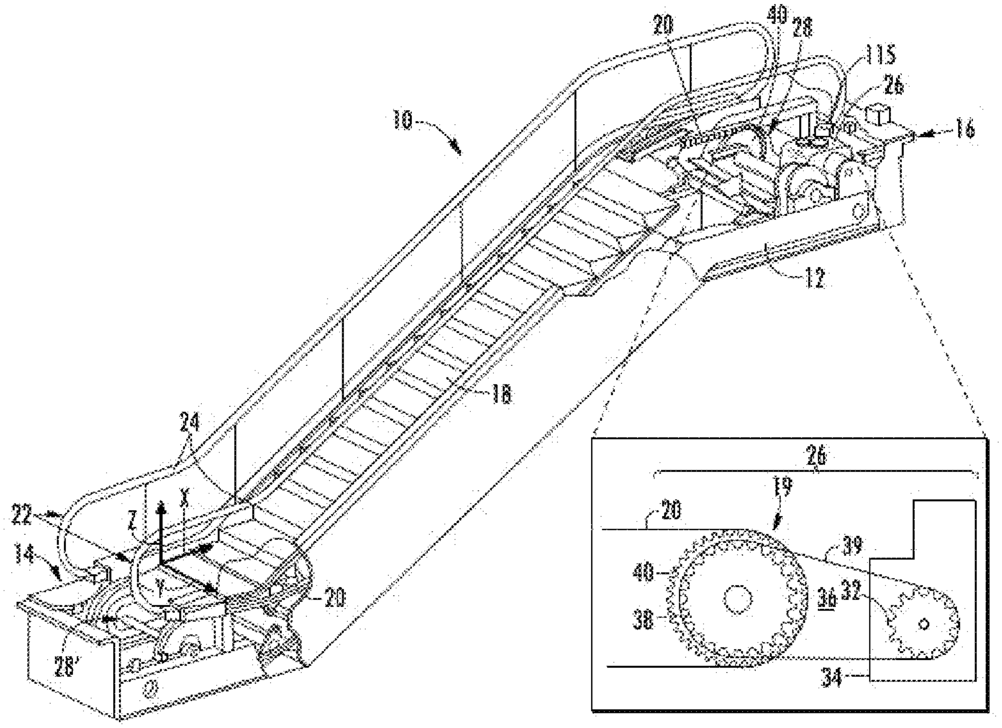
FIG. 1 is a schematic diagram of an escalator 10.

FIG. 1 illustrates an escalator 10. It should become apparent in the ensuing description that the present invention is applicable to other passenger conveyor systems, such as moving walks. The escalator 10 generally includes a truss 12 extending between a lower landing 14 and an upper landing 16. A plurality of sequentially connected steps or tread plates 18 are connected to a step chain 20 and travel through a closed loop path within the truss 12. A pair of balustrades 22 includes moving handrails 24. A drive machine 26, or drive system, is typically located in a machine space 28 under the upper landing 16; however, an additional machine space 28' can be located under the lower landing 14. The drive machine 26 is configured to drive the tread plates 18 and/or handrails 24 through the step chain 20. The drive machine 26 operates to move the tread plates 18 in a chosen direction at a desired speed under normal operating conditions.

The tread plates 18 make a 180 degree heading change in a turn-around area 19 located under the lower landing 14 and upper landing 16. The tread plates 18 are pivotally attached to the step chain 20 and follow a closed loop path of the step chain 20, running from one landing to the other, and back again.

The drive machine 26 includes a first drive member 32, such as motor output sheave, connected to a drive motor 34 through a belt reduction assembly 36 including a second drive member 38, such as an output sheave, driven by a tension member 39, such as an output belt. The first drive member 32 in some embodiments is a driving member, and the second drive member 38 is a driven member.

As used herein, the first drive member 32 and/or the second drive member 38, in various embodiments, may be any type of rotational device, such as a sheave, pulley, gear, wheel, sprocket, cog, pinion, etc. The tension member 39, in various embodiments, can be configured as a chain, belt, cable, ribbon, band, strip, or any other similar device that operatively connects two elements to provide a driving force from one element to another. For example, the tension member 39 may be any type of interconnecting member that extends between and operatively connects the first drive member 32 and a second drive member 38. In some embodiments, as shown in FIG. 1, the first drive member 32 and the second drive member may provide a belt reduction. For example, first drive member 32 may be approximately 75 mm (2.95 inches) in diameter while the second drive member 38 may be approximately 750 mm (29.53 inches) in diameter. The belt reduction, for example, allows the replacement of sheaves to change the speed for 50 or 60 Hz electrical supply power applications, or different step speeds. However, in other embodiments the second drive member 38 may be substantially similar to the first drive member 32.

As noted, the first drive member 32 is driven by drive motor 34 and thus is configured to drive the tension member 39 and the second drive member 38. In some embodiments, the second drive member 38 may be an idle gear or similar device that is driven by the operative connection between the first drive member 32 and the second drive member 38 by means of tension member 39. The tension member 39 travels around a loop set by the first drive member 32 and the second drive member 38, which hereinafter may be referred to as a small loop. The small loop is provided for driving a larger loop which consists of the step chain 20, and is driven by an output sheave 40, for example. Under normal operating conditions, the tension member 39 and the step chain 20 move in unison, based upon the speed of movement of the first drive member 32 as driven by the drive motor 34.

The escalator 10 also includes a controller 115 that is in electronic communication with the drive motor 34. The controller 115 may be located, as shown, in the machine space 28 of the escalator 10 and is configured to control the operation of the escalator 10. For example, the controller 115 may provide drive signals to the drive motor 34 to control the acceleration, deceleration, stopping, etc. of the tread plates 18 through the step chain 20. The controller 115 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Figure 2:
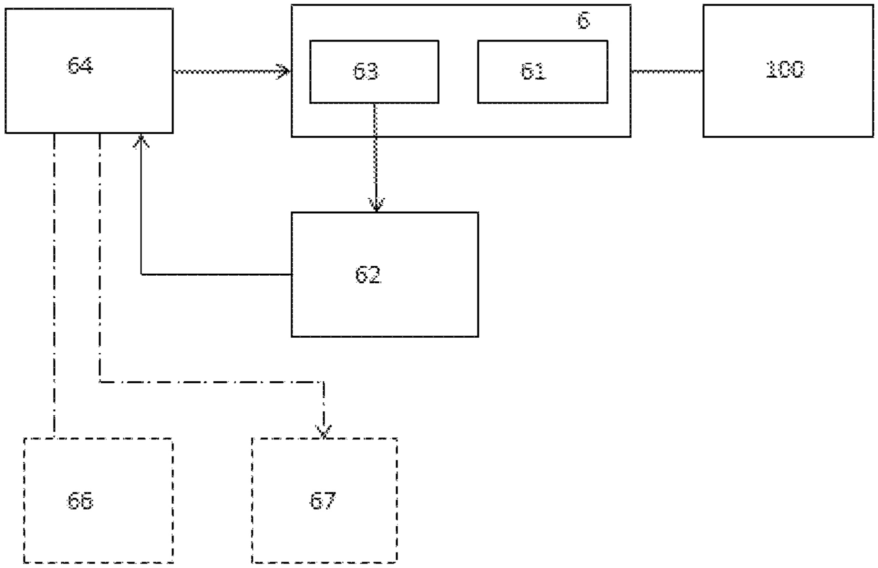
FIG. 2 is a structural schematic diagram of an escalator brake system according to some examples of the present disclosure.

FIG. 2 is a structural schematic diagram of an escalator brake system according to some examples of the present disclosure. This diagram illustrates, in the form of a block diagram, the relationships between the various components of the brake system according to the examples of the present disclosure, without limiting the shape, size, structure, and mechanical connection relationships of the various components of the brake system. As shown in FIG. 2, the escalator brake system comprises a brake 6, a distance detection device 62, and a controller 64.

The brake 6 comprises a brake lining 61 and a brake arm 63, where the brake arm 63 is connected to the brake lining 61. Under the action of a driving force, the brake arm 63 drives the brake lining 61 to move. When the brake 6 is in a closed state, a brake surface of the brake lining 61 joins with a brake drum 100, thus achieving brake on the brake drum 100 through the friction between the two. When the brake 6 switches from a closed state to an open state, the brake lining 61 is driven by the brake arm 63 to leave the brake drum 100, thus releasing the brake on the brake drum 100.

The distance detection device 62 (e.g., a sensor such as an ultrasonic sensor, IR sensor, etc.) is arranged on the brake 6, and is configured to detect a first distance and a second distance. The first distance is the distance between the brake arm 63 and the brake drum 100 when the brake 6 is in an open state, and the second distance is the distance between the brake arm 63 and the brake drum 100 when the brake 6 is in a closed state.

The controller 64 (e.g., a microprocessor-based controller executing code to perform the operations described herein) determines the brake performance of the brake 6 based on the difference between the first distance and the second distance. Specifically, with the use of the brake lining 61, its wear becomes more and more severe, so its thickness decreases accordingly. Therefore, when the brake surface 610 of the brake lining 61 joins with the brake drum 100, the second distance detected by the distance detection device 62 will decrease. With the first distance unchanged, the gap C between the brake drum 100 and the brake surface 610 of the brake lining 61 determined by the difference between the first distance and the second distance will increase.

For the brake of the escalator, the size of the gap C should be within a preset range, so as to ensure that when the electromagnet is powered off, the brake arm 63 is fully fallen so that the brake 6 is fully closed in a closed state, and when the electromagnet is powered on, the brake arm 63 is fully opened so that the brake 6 is fully opened in an open state. If the gap C is not within the preset range, it may result in that the fall of the brake arm cannot enable the brake to be fully closed when the electromagnet is powered off, resulting in a decrease in the brake effect, and that the brake arm cannot be fully opened when the electromagnet is powered on, so that the brake lining keeps rubbing against the brake drum during the operation of the escalator, which may cause safety accidents.

According to the examples of the present disclosure, when the calculated difference is not within the preset range, the controller 64 generates and sends warning signals so that brake performance degradation or other possible anomalies can be detected. In some examples, the controller 64 is connected to an output unit 66 and/or a remote monitoring room 67. As a result, the sent warning signals will be output by the output unit 66 (e.g., a display, light, and/or speaker) and/or received by the remote monitoring room 67. The output unit 66 may output in an audible manner, in a visible manner, or in a manner combing the two. It should be appreciated that the controller 64 can be connected to the output unit 66 through a line or through wireless communication, where the output unit can be an output component of an escalator according to the examples of the present disclosure. The controller 64 can be connected to the remote monitoring room through wireless communication or through a line.

Figure 3A:
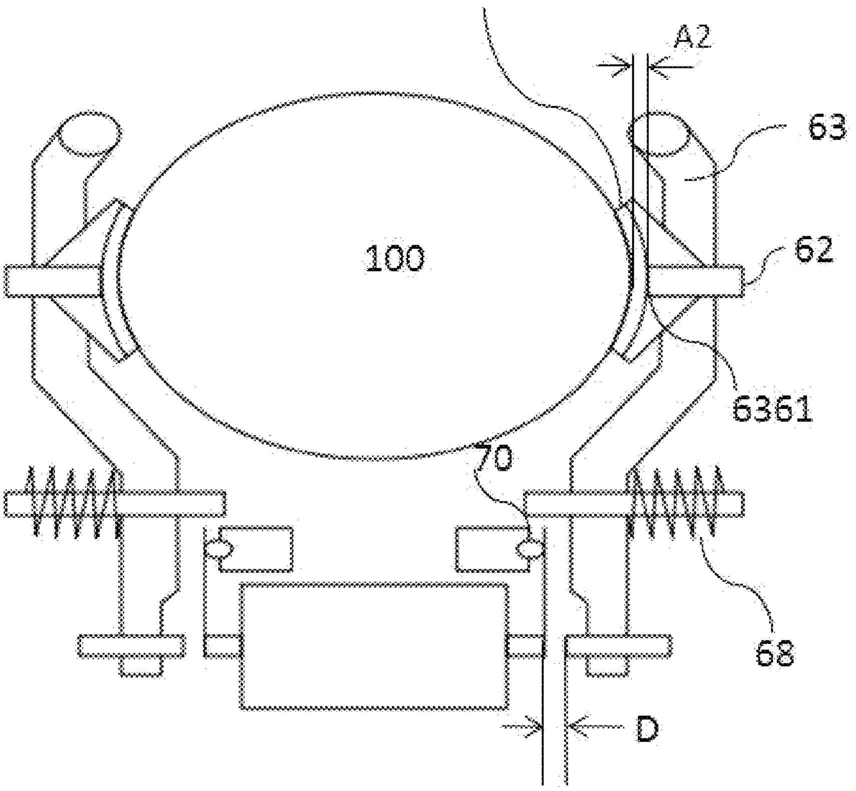
FIG. 3A is a structural schematic diagram when the brake is in a closed state.
Figure 3B:
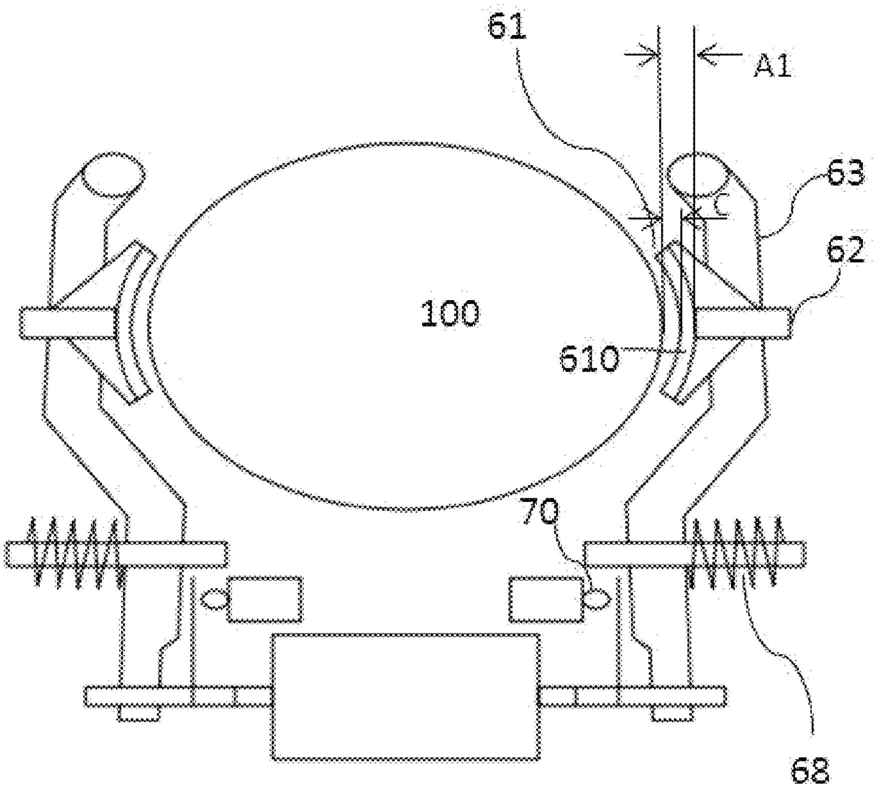
FIG. 3B is a structural schematic diagram when the brake is in an open state.

FIGS. 3A and 3B illustrate the structure of the brake 6, where FIG. 3A is a structural schematic diagram when the brake is in a closed state, and FIG. 3B is a structural schematic diagram when the brake is in an open state. Only the general structure of the brake 6 and all its components that are relevant to the present disclosure are illustrated here, but the specific structure of the brake 6 may be more complex. FIGS. 3A and 3B are not intended to limit the structure, size, and dimensions of the brake according to the various examples of the present disclosure to be completely consistent with those shown in the figures.

Referring to FIG. 3A, the electromagnet of the brake 6 is powered off, so the brake arm 63, under the action of a spring 68, causes the brake 6 to be in a closed state, that is, the brake surface 610 (see FIG. 3B) of the brake lining 61 is tightly pressed against the brake drum 100 to achieve braking based on friction.

Referring to FIG. 3B, the electromagnet of the brake 6 is powered on, so the brake arm 63, under the action of the magnetic field, overcomes the elastic force of the spring 68 to move away from the brake drum. The brake arm 63 drives the brake lining 61 connected with it to move together, and after the brake surface 610 of the brake lining 61 is separated from the brake drum 100, the braking is released. The brake arm 63 will eventually remain stationary under the balance of forces, causing the brake 6 to enter the open state. For example, the brake arm 63 presses against a static plate (not shown) and remains stationary under the force of the spring, the force of the magnetic field, and the force of the static plate, entering the open state shown in FIG. 3B.

Reference is made to FIGS. 2, 3A, and 3B at the same time. According to some examples of the present disclosure, the distance detection device 62 is arranged on the brake 6 in such a way that the distance detection device 62 can sense the distance from the set position of the brake arm 63 to the brake drum 100. That is, according to the examples of the present disclosure, a suitable position can be picked on the brake arm of the brake as the set position, so that the distance detection device 62 can detect the first and second distances from the set position to the brake drum. This allows the setting of the distance detection device 62 to be determined as desired. For example, according to some embodiments of the present disclosure, the distance detection device 62 is arranged within the brake arm. In some specific example below, the selected set position is a joint surface 6361 between the brake arm 63 and the brake lining 61 and the distance detection device 62 is located near the joint surface 6361 within the brake arm, in which the distance detection device 62 can be a distance sensor (also known as a displacement sensor).

The set position can be a position on the brake arm 63. And, in further examples of the present disclosure, the set position can be selected as: one of a plurality of positions on the brake arm 63 that are perpendicular to the joint surface of the brake lining 61 and the brake drum 100 when the brake lining 61 joins with the brake drum 100.

According to a specific example of the present disclosure, such as in the example shown in FIGS. 3A and 3B, the distance detection device 62 is a distance sensor, which is arranged within the brake arm 63 near a set position, where the set position is the joint surface 6361 of the brake arm 63 and the brake lining 61. In some cases, the distance sensor 62, which serves as the distance detection device (a distance sensor is also directly used as a distance detection device in the ensuing depiction of specific examples below), is arranged in such a way that the emitting surface of the sensing signals of the distance sensor is flush with the joint surface 6361 of the brake arm 63 and the brake lining 61, which is equivalent to that the distance sensor 62 is embedded in the brake arm 63 and directly in contact with the brake lining 61. If the brake surface 610 of the brake lining 61 is referred to as the top surface, the surface where the brake lining 61 joins with the brake arm 63 can be referred to as the bottom surface of the brake lining. In this specific example, the distance sensor 62 is arranged within the brake arm and joins with the bottom surface of the brake lining to sense the distance from the bottom surface of the brake lining to the brake drum under different circumstances.

As an alternative, the distance sensor 62 can also disposed along the vertical plane perpendicular to the joint surface of the brake lining 61 and the brake drum 100 but be recessed into the brake arm 63, that is, not flush with the surface 6361.

When the brake 6 is in a closed state as shown in FIG. 3A, the distance sensor 62 can sense the distance between the brake arm 63 and the brake drum 100, which is a second distance A2. More specifically, the second distance A2 is the distance between the distance sensor 62 and the brake drum joint surface where the brake drum 100 joins with the brake lining 61, when the brake 6 is in a closed state. It should be noted that the distance sensor 62 can be various sensors capable of sensing distance, such as infrared distance sensors, laser distance sensors, and so on.

Subsequently, the brake 6 releases the braking and switches to an open state, as shown in FIG. 3B. When the brake 6 is in an open state, the distance sensor 62 can senses the distance between the brake arm 63 and the brake drum 100, i.e., a first distance A1. More specifically, the first distance A1 is the distance between the distance detection device 62 and the brake drum joint surface where the brake drum 100 joins with the brake lining 61, when the brake 6 is in an open state.

A gap C between the brake surface 610 of the brake lining 61 and the brake drum 100 when the brake 6 is in an open state is the difference between the first distance A1 and the second distance A2. As discussed earlier, the first distance A1 remains basically unchanged. In this case, the controller 64 can, by calculating the distance difference between two sequential detections respectively performed in the open and closed states, monitor the actual value of the gap C and its changes during operation of the escalator, and detect abnormal situations of C in a timely manner, for example, whether the size of C exceeds an upper limit of a preset range. For example, the preset range of C is 1 mm to 1.5 mm. If the controller 64 detects that the value of C exceeds 1.5 mm, it will generate and send warning signals.

The warning signals can be sent to the escalator monitoring room, and output in a visible and/or audible manner, so that relevant personnel can be informed and take measures, such as replacing brake linings, as soon as possible. In addition, in some cases, the controller 64 can also be configured to take safety measures, such as forcefully braking to stop the escalator from running to ensure safety, in the event that C is not within the preset range.

In addition, a distance D from a switch contact 70 of the electromagnet module to the brake arm 63 can also be monitored based on the size of the gap C. For the brake 6, there is a certain correspondence between the distance D and the gap C. When the brake 6 is adjusted and put into use, the proportional relationship between the distance D and the gap C can be determined. After the brake is put into use and the brake lining 61 is replaced, the relationship between the distance D and the gap C should be consistent with the previously determined proportional relationship. Therefore, after the brake lining is replaced, the measurement of A1 and A2 can be performed to determine C, so as to judge whether the adjusted distance between the contact 70 and the brake arm 63 after the brake lining is replaced is accurate, and in some cases, the direction of adjustment can also be given, such as to increase or decrease the distance D.

The escalator brake system described above in conjunction with FIGS. 2, 3A, and 3B can be implemented in an escalator as shown in FIG. 1. For example, the controller 64 can be implemented in the controller 115 (see FIG. 1), and a distance detection device is arranged within the brake (not shown) of FIG. 1.

Figure 4:
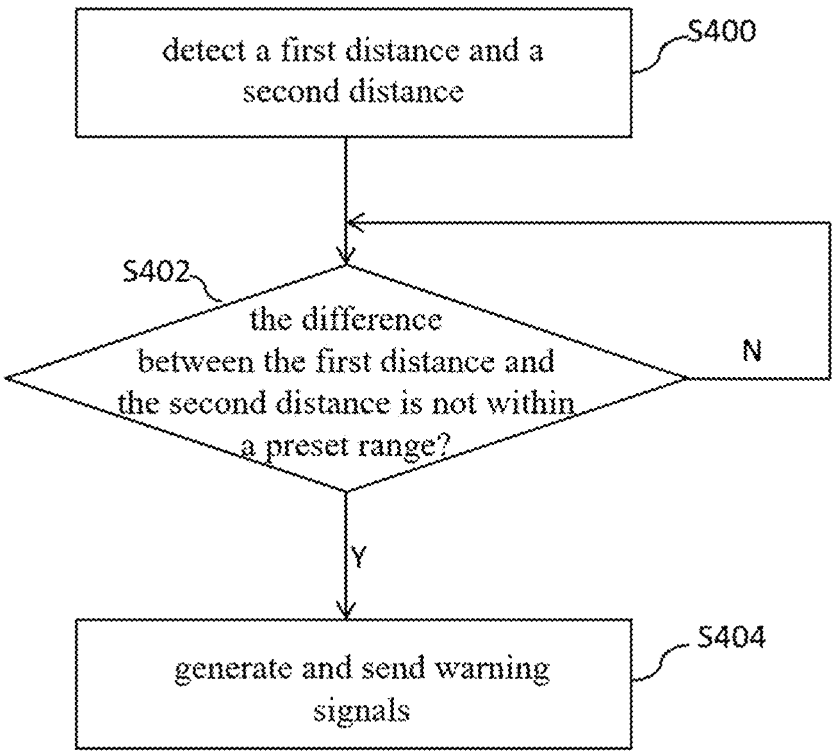
FIG. 4 is a flowchart of a detection method for an escalator brake system according to the examples of the present disclosure.

FIG. 4 is a flowchart of a detection method for an escalator brake system according to examples of the present disclosure. According to this method, in step S400, the first distance and the second distance between the brake arm and the brake drum of the brake are detected, where the first distance is the distance between the brake arm and the brake drum when the brake is in an open state, and the second distance is the distance between the brake arm and the brake drum when the brake is in a closed state. In step S402, the difference between the first distance and the second distance that are subsequently detected (i.e., the detection time of which is adjacent to each other) is compared with a preset range. If the comparison result shows that the difference is not within the preset range, proceed to step S404, otherwise continue to perform step S402. In step S404, warning signals are generated and sent. In some cases, safety measures can also be taken in step S404, such as stopping the operation of the escalator.

The method shown in FIG. 4 can be executed by the system shown in FIG. 2. The following further elaborates on the embodiments of the present disclosure in conjunction with FIGS. 2, 3A, and 3B. When the brake 6 is in an open state (see FIG. 3B), the distance to the brake drum 100, i.e., the first distance A1, is detected by the distance detection device 62 arranged on the brake arm 63 (step S400). When the brake 6 is in a closed state (see FIG. 3A), the distance to the brake drum 100, i.e., the second distance A2, is detected by the distance detection device 62 arranged on the brake arm 63 (step S400). The controller 64 calculates the difference between the first distance A1 and the second distance A2 (step S402), where the difference is the gap C between the brake surface 610 of the brake lining 61 and the brake drum 100 when the brake 6 is in an open state. The controller 64 further compares the size of the gap C with the preset range (step S402), so as to determine the brake performance of the brake 6. When the comparison result shows that the size of the gap C is not within the preset range, the controller 64 generates and sends warning signals (step S404). The controller 64 takes safety measures, such as stopping the operation of the escalator, in some cases.

The detection method for an escalator brake system according to examples of the present disclosure can be implemented as a program instruction module, which can be configured in the controller 115 of the escalator system shown in FIG. 1, so that the escalator system shown in FIG. 1 can monitor the performance of the brake by detecting the first and second distances. Of course, when executing the method according to the examples of the present disclosure, a distance detection device also needs to be arranged on brake arm of the escalator shown in FIG. 1, for example.

Figure 5:
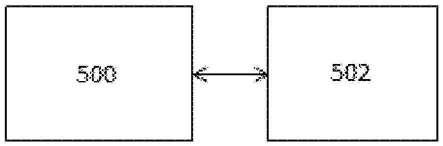
FIG. 5 is a structural schematic diagram of a controller according to some examples of the present disclosure.

The present disclosure also provides a controller. FIG. 5 illustrates the structural diagram of the controller. The controller comprises a memory 500 and a processor 502. The memory 500 stores program instructions, and the processor 502 executes the instructions, where when the instructions are being executed, the escalator brake system is made to execute various examples of the method described above in conjunction with FIG. 4. Wherein, the escalator system is an example of an escalator brake system described in combination with any of FIGS. 2, 3A, and 3B. The controller can be integrated into the controller 115 of the escalator shown in FIG. 1.

The present disclosure further provides a conveyor system capable of executing various examples of the method described above in conjunction with FIG. 4, or comprising a brake system for a conveyor system described in conjunction with any of FIGS. 2, 3A, and 3B. As an example, the conveyor system may be an escalator or a travelator.

Although specific embodiments of the present disclosure have been shown and described in detail to illustrate the principle of the present disclosure, it should be understood, however, that the present disclosure may be implemented in other ways without departing from the principle.

What is claimed is:

1. A brake system for a conveyor system, comprising:

a brake comprising a brake arm and a brake lining connected to the brake arm;

a distance detection device arranged on the brake for detecting a first distance and a second distance between the brake arm and a brake drum, where the first distance is a distance between the brake arm and the brake drum when the brake is in an open state, and the second distance is a distance between the brake arm and the brake drum when the brake is in a closed state; and a controller for determining a brake performance of the brake based on a difference between the first distance and the second distance detected sequentially as the brake transitions between the open state and the closed state, and for generating and sending warning signals when the difference is not within a preset range.

2. The brake system according to claim 1, wherein the distance detection device is arranged on the brake in a way that is capable of sensing a distance between a set position of the brake arm and the brake drum, where the first distance and the second distance are distances between the set position and the brake drum in the open state and the closed state, respectively.

3. The brake system according to claim 2, wherein the distance detection device is arranged within the brake arm, and the set position is a joint surface of the brake arm and the brake lining.

4. The brake system according to claim 3, wherein the distance detection device is arranged within the brake arm near the set position.

5. The brake system according to claim 1, wherein the controller is connected to an output unit and/or a remote monitoring room.

6. The brake system according to claim 1, wherein the distance detection device is a distance sensor.

7. A detection method for a brake for a conveyor system, comprising:

detecting a first distance and a second distance between a brake arm and a brake drum of the brake, where the first distance is a distance between the brake arm and the brake drum when the brake is in an open state, and the second distance is a distance between the brake arm and the brake drum when the brake is in a closed state, the first distance and the second distance detected sequentially as the brake transitions between the open state and the closed state;

comparing a difference between the first distance and the second distance with a preset range to determine a brake performance of the brake; and generating and sending warning signals when a comparison result shows that the difference is not within the preset range.

8. The method according to claim 7, wherein detecting the first distance and the second distance between the brake arm and the brake drum of the brake comprises:

detecting, by a distance detection device arranged on the brake arm, a distance between a set position of the brake arm and the brake drum as the first distance, when the brake is in an open state; and detecting, by the distance detection device, a distance between the set position of the brake arm and the brake drum as the second distance when the brake is in a closed state.

9. The method according to claim 8, wherein the distance detection device is arranged within the brake arm, and the set position is a joint surface of the brake arm and the brake lining.

10. The method according to claim 9, wherein the distance detection device is arranged within the brake arm near the set position.

11. The method according to claim 10, wherein the distance detection device is a distance sensor.

12. A controller, comprising a memory for storing instructions and a processor for executing the instructions to:

detect a first distance and a second distance between a brake arm and a brake drum of a brake for a conveyor system, where the first distance is a distance between the brake arm and the brake drum when the brake is in an open state, and the second distance is a distance between the brake arm and the brake drum when the brake is in a closed state, the first distance and the second distance detected sequentially as the brake transitions between the open state and the closed state;

compare a difference between the first distance and the second distance with a preset range to determine a brake performance of the brake; and generate and send warning signals when a comparison result shows that the difference is not within the preset range.

13. A conveyor system, wherein the conveyor system comprises the brake system according to claim 1.

14. The brake system according to claim 1, wherein the conveyor system comprises an escalator or a travelator.

15. The method according to claim 7, further comprising monitoring a distance (D) from a switch contact (70) of an electromagnet module provided on the brake to the brake arm (63) based on the difference.

* * * * *